(12) United States Patent
Umehara (10) Patent No.: US 7,434,832 B2
(45) Date of Patent: Oct. 14, 2008

(54) AIR BAG AND AIR BAG APPARATUS FOR VEHICLE

(75) Inventor: Jyunichi Umehara, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 105 days.

(21) Appl. No.: 11/387,931

(22) Filed: Mar. 24, 2006

(65) Prior Publication Data

US 2006/0220358 A1   Oct. 5, 2006

(30) Foreign Application Priority Data

Mar. 31, 2005   (JP) ............... 2005-104338

(51) Int. Cl.
*B60R 21/16* (2006.01)
(52) U.S. Cl. .................................. 280/730.2
(58) Field of Classification Search ............... 280/743.1, 280/730.2
See application file for complete search history.

(56) References Cited

U.S. PATENT DOCUMENTS 6,032,977 A   3/2000   Reh et al.
6,142,507 A * 11/2000   Okuda et al. ............. 280/730.2
6,302,431 B1  10/2001   Sasaki et al.
6,364,348 B1   4/2002   Jang et al.
2006/0043702 A1* 3/2006   Jamison ...................... 280/729

FOREIGN PATENT DOCUMENTS

JP   8-2364 A1    1/1996
JP   8-192712 A1  7/1996
JP   8-225054 A1  9/1996

* cited by examiner

*Primary Examiner*—Faye M. Fleming
(74) *Attorney, Agent, or Firm*—Sughrue Mion, PLLC

(57) ABSTRACT

An air bag including a first panel, a second panel opposed to the first panel, and a third panel cooperating with the first and second panels to define an opening in the vicinity of one end portion of the air bag that serves as a starting point for deployment. The first and third panels are connected with each other along entire outer peripheries thereof except around the opening of the air bag. The second and third panels are connected with each other along entire outer peripheries thereof except around the opening. The air bag is disposed at a folded state behind a back of an occupant and deployable between the occupant and an inside surface of a side of a vehicle compartment so as to cover a side of the occupant.

20 Claims, 3 Drawing Sheets

AIR BAG AND AIR BAG APPARATUS FOR VEHICLE

BACKGROUND OF THE INVENTION

The present invention relates to an air bag and an air bag apparatus which is applicable to a vehicle, for instance, an automobile, so as to deploy the air bag from a side of an occupant's seat along a side of an occupant on the seat.

Conventionally, there has been proposed a so-called side air bag apparatus for an automobile which is adapted to deploy an air bag on a side of an occupant in order to protect the occupant upon occurrence of side collision of the automobile. The air bag is installed in a folded state on a side of an occupant's seat and inflatable and deployable between the occupant and a door of the automobile so as to protect a side portion of the occupant. The side air bag apparatus includes a bag-shaped air bag and an inflator for supplying gas to the air bag. The air bag is formed into a flat bag shape by overlapping a pair of base clothes and sewing them together along outer peripheries thereof. However, when the thus-constructed air bag is deployed by supplying the gas thereto, the air bag is deformed into a spindle shape in section in which a central portion of the air bag has a maximum thickness and the outer peripheral portion thereof has a less thickness. In the air bag construction in which the thickness is locally varied when deployed, it is not always easy to deploy the air bag in a predetermined position in a stable state. Further, for the purpose of ensuring a protecting region in the air bag which has a predetermined thickness, namely, a predetermined impact-absorption stroke, to protect the occupant, it is required to construct an air bag that has a large shape in a side view by increasing the base clothes.

Japanese Patent Application First Publication No. 8-2364 describes a multi-cell air bag which is adapted to be deployed from a door side of an automobile. The air bag has a generally rectangular shape and includes multiple tubular air cells formed by a plurality of base clothes, each of which is curved into a U-shape in section. The U-shaped base clothes are overlapped with and sewed to one another to form the multiple tubular air cells aligned in a row. A pair of rectangular base clothes are sewed to upper and lower openings of the U-shaped base clothes to thereby form the rectangular box-shape. However, this sewing work is complicated and troublesome in view of cost saving. Further, the air bag inflatable from the door side has a gas introduction inlet on a planar portion of one of opposed side portions of the air bag at which the air bag is fixed to a door panel side of the automobile. When deployed, the air bag is not supported at only one end and the air bag can be readily and stably developed along a planar door panel. Thus, it will be unnecessary to consider stability of a deploying attitude of the air bag inflatable from the door side.

Japanese Patent Application First Publication No. 8-192712 describes an air bag that is formed by folding a rectangular base cloth at a centerline into halves, overlapping the halves each other and sewing them together along outer peripheries thereof to form a rectangular bag. Then, the rectangular bag is formed into a rectangular box-shaped air bag that has two opposed side portions and a peripheral portion between the opposed side portions, by tucking and sewing four corners of the rectangular bag. In the thus-formed box-shaped air bag, four corner portions thereof become stiff due to tucking, and a middle area of the peripheral portion becomes stiff along the seam line that extends in the middle area of the peripheral portion. On the other hand, ridges between the peripheral portion and the side portions are formed by simply folding and become relatively soft. The air bag, therefore, tends to be deployed in the form of a generally spindle shape in section. Similar to the above-mentioned conventional art, the air bag of this conventional art has a gas introduction inlet on a planar portion of one of the opposed side portions. Accordingly, it will be unnecessary to consider stability of a deploying attitude of the air bag of the conventional art. Further, in a modified air bag of the above conventional art, the gas introduction inlet is formed at one of the corner portions which is free from tucking. The modified air bag also has the seam line that extends in the middle area of the peripheral portion. Thus, the modified air bag is not constructed so as to stabilize the deploying attitude.

Japanese Patent Application First Publication No. 8-225054 describes a box-shaped air bag that includes two opposed main base clothes and a peripheral base cloth through which outer peripheries of the main base clothes are connected with each other. In the air bag of the conventional art, a gas introduction inlet is formed in one of the main base clothes which is attached to a door panel of an automobile. It will be unnecessary to consider stability of a deploying attitude of the air bag of this conventional art.

SUMMARY OF THE INVENTION

With respect to the air bag that is inflatable from one end portion as a starting point for deployment to a flat box-shape, there is a demand to easily stabilize the deploying attitude and ensure a protection region of a predetermined area for protecting an occupant of the automobile.

It is an object of the present invention to provide an air bag which is capable of deploying at one end portion thereof as a starting point to a flat box-shaped state, readily stabilizing the deploying attitude and providing a protection region of a predetermined area for protecting an occupant of an automobile, and provide an air bag apparatus including the air bag.

In one aspect of the present invention, there is provided an air bag for a vehicle, the air bag being deployable from one end portion thereof as a starting point for deployment along an occupant of the vehicle, the air bag comprising:

a first panel adapted to be opposed to the occupant;

a second panel opposed to the first panel; and a third panel cooperating with the first and second panels to define an opening in the vicinity of the starting point for deployment, wherein the first and third panels are connected with each other along entire outer peripheries thereof except around the opening of the air bag, and the second and third panels are connected with each other along entire outer peripheries thereof except around the opening.

In a further aspect of the present invention, there is provided an air bag apparatus for a vehicle, the air bag apparatus being useable within a compartment of the vehicle, the air bag apparatus comprising:

an air bag deployable from one end portion thereof as a starting point for deployment along an occupant of the vehicle, the air bag including a first panel adapted to be opposed to the occupant, a second panel opposed to the first panel, and a third panel cooperating with the first and second panels to define an opening in the vicinity of the starting point for deployment, the first and third panels being connected with each other along entire outer peripheries thereof except around the opening, the second and third panels being connected with each other along entire outer peripheries thereof except around the opening; and an inflator that supplies gas to the air bag, wherein the air bag is disposed at a folded state behind a back of the occupant and deployable between the occupant and an inside surface of a side of the compartment so as to cover a side of the occupant when the gas is supplied to the air bag.

In a still further aspect of the present invention, there is provided an air bag apparatus for a vehicle, comprising:

an air bag deployable from one end portion thereof into a flat box-shape along a side of an occupant of the vehicle, the air bag being formed by a first panel, a second panel opposed to the first panel and a third panel interposed between the first and second panels and cooperating with the first and second panels to define an opening, the first and third panels being connected with each other along entire outer peripheries thereof except around the opening the second and third panels being-connected with each other along entire outer peripheries thereof except around the opening;

an inflator disposed inside the one end portion of the air bag, the inflator supplying gas to the air bag; and fixing means for fixing the air bag with the inflator to a vehicle body.

wherein the air bag includes a fold-fixed portion that is folded to block fluid communication between an inside of the air bag and an outside thereof through the opening and fixed to the vehicle body by the fixing means.

DETAILED DESCRIPTION OF THE INVENTION

Figure 1:
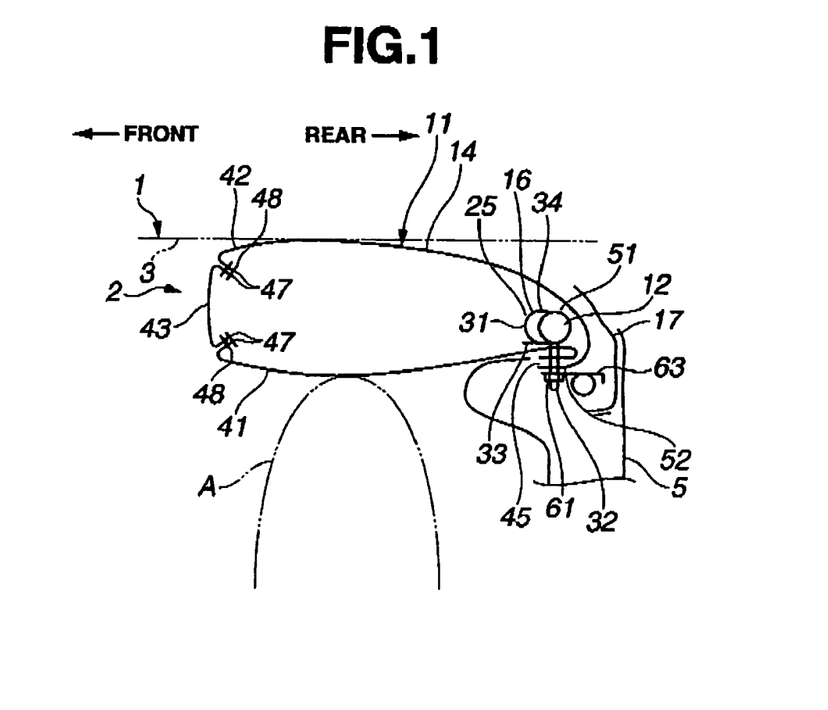
FIG. 1 is a schematic cross section, taken along line 1-1 shown in FIG. 5, of an air bag apparatus of an embodiment according to the present invention, showing a fully deployed state of an air bag of the air bag apparatus.
Figure 2:
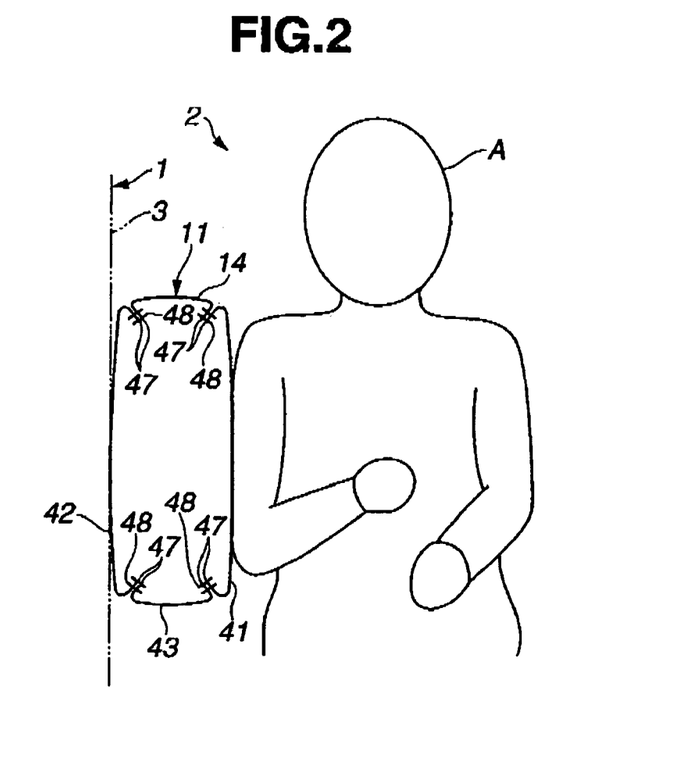
FIG. 2 is a schematic cross section, taken along line 2-2 shown in FIG. 5, of the air bag apparatus of the embodiment, as viewed from a front side of a vehicle compartment.

In the following, an embodiment of the present invention will be described in detail with reference to the accompanying drawings. Referring to FIGS. 1-2, there is shown an air bag apparatus for a vehicle, according to the embodiment of the present invention. In this embodiment, the air bag apparatus is used as a so-called side air bag apparatus for an automobile. As illustrated in FIG. 1, air bag apparatus 11 is mounted to a back of occupant's seat 5 that is disposed adjacent to side door 3 within compartment 2 of body 1 of the automobile. Air bag apparatus 11 is adapted to inflate and deploy between occupant A who occupies seat 5 and a lower portion of door 3 so as to protect a side portion of occupant A over a waist to a chest of occupant A. In addition to air bag apparatus 11 in compartment 2, there may be also provided an air bag apparatus deployable from a steering wheel, a passenger's side air bag apparatus deployable from an instrument panel, a curtain air bag apparatus that is deployable from a roof side downwardly to cover an upper portion of door 3.

Air bag apparatus 11 includes inflator 12 that generates and injects gas, bag-shaped air bag 14 inflatable and deployable by action of the gas supplied by inflator 12, fixing member 16 that connects inflator 12 and air bag 14 together and fixes inflator 12 and air bag 14 to seat 5, and casing 17 that accommodates inflator 12, air bag 14 and fixing member 16. Casing 17 may be made of a suitable resin material.

Figure 3:
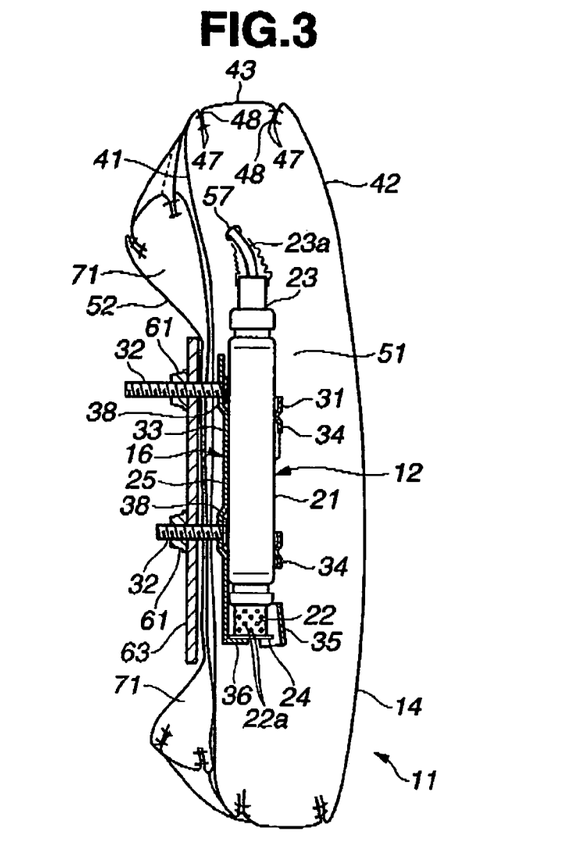
FIG. 3 is an enlarged vertical cross section of the air bag apparatus of the embodiment.

As illustrated in FIG. 3, inflator 12 has a generally cylindrical body 21 and gas supply portion 22 that projects from one end portion of body 21. An opposite end portion of body 21 is provided with terminal 23 for activating inflator 12, to which harness 23a is connected. Inflator 12 is connected with a controller, not shown, and actuated by electric power supplied thereto via harness 23a. Gas supply portion 22 is in the form of a diffuser that supplies gas. Gas supply portion 22 extends from the one end portion of body 21 and forms a generally cylindrical shape. A diameter of gas supply portion 22 may be smaller than a diameter of body 21 or substantially equal to the diameter of body 21. Gas supply portion 22 has a plurality of circular holes 22a on a circumferential surface thereof, each serving as a gas discharge port from which the gas is discharged into air bag 14. Disk-shaped top board 24 is disposed on a tip end portion of gas supply portion 22. In this embodiment, inflator 12 is a so-called hybrid inflator that reacts propellant filled within body 21 and releases gas reserved within a cylinder in body 21 to thereby inject relatively low temperature gas from gas supply portion 22.

As illustrated in FIG. 1, fixing member 16 includes retainer 25 as a fastening member on the inside of air bag 14. Retainer 25 includes retainer body 31 and vehicle-side fixing portion 32 that is connected with retainer body 31 and fixed to frame 63 of seat 5. Retainer body 31 is formed by bending a sheet metal. Vehicle-side fixing portion 32 is secured to retainer body 31 by a suitable method, for instance, welding. In this embodiment, vehicle-side fixing portion 32 is provided in the form of a bolt. specifically, as illustrated in FIG. 3, retainer body 31 includes generally flat plate-shaped base plate 33, a pair of generally cylindrical holder portions 34 integrally formed with base plate 33, and generally cylindrical guide portion 35 integrally formed with base plate 33. Base plate 33 constitutes an air bag opposing portion that is opposed to an inside surface of air bag 14. Base plate 33 and holder portions 34 cooperate with each other to constitute an inflator fixing portion that fixes inflator 12 to inflator accommodating portion 51 of air bag 14 as explained later. Holder portions 34 extend from base plate 33 and curves to form a generally cylindrical shape into which body 21 of inflator 12 can be inserted. Holder portions 34 have fixed portions on one end portions thereof which are secured to base plate 33 by welding or by means of rivets. Holder portions 34 are elastically contacted with inflator 12 and cooperate with base plate 33 to support inflator 12 in such a manner that inflator 12 is interposed therebetween and retain inflator 12 in place in a radial direction of inflator 12.

Guide portion 35 is a so-called skirt portion that extends along an axial direction of inflator 12 so as to form a generally truncated cone that is increased in diameter in one direction. Guide portion 35 has an inner circumferential surface that is opposed to and spaced from an outer circumferential surface of gas supply portion 22 of inflator 12 with a predetermined clearance. The inner circumferential surface of guide portion 35 is inclined relative to the outer circumferential surface of gas supply portion 22 and serves as a gas guide surface which guides the gas injected from gas supply portion 22. That is, guide portion 35 is constructed to distribute a large amount of the gas in one direction at a predetermined ratio as compared to in other directions. In this embodiment, guide portion 35 is expanded in one direction toward a tip end portion of inflator 12, namely, the tip end portion of gas supply portion 22, such that a large amount of the gas is directed in the direction.

Base plate 33 of retainer body 31 further includes stop 36 that projects from an end portion of base plate 33. Stop 36 is contacted with top board 24 that is provided on gas supply portion 22 of inflator 12, namely, on the tip end portion of inflator 12, and retains inflator 12 in place in the axial direction. Base plate 33 further includes a pair of protrudent portions 38 that extend in a direction opposite to the direction in which holder portions 34 extend from base plate 33. Protrudent portions 38 are formed into a rectangular shape, to which heads of respective bolts 32 as the vehicle-side fixing portions are secured. Thus, vehicle-side fixing portions 32 project from base plate 33 and are fixed to seat frame 63 by means of nuts 61.

Figure 4:
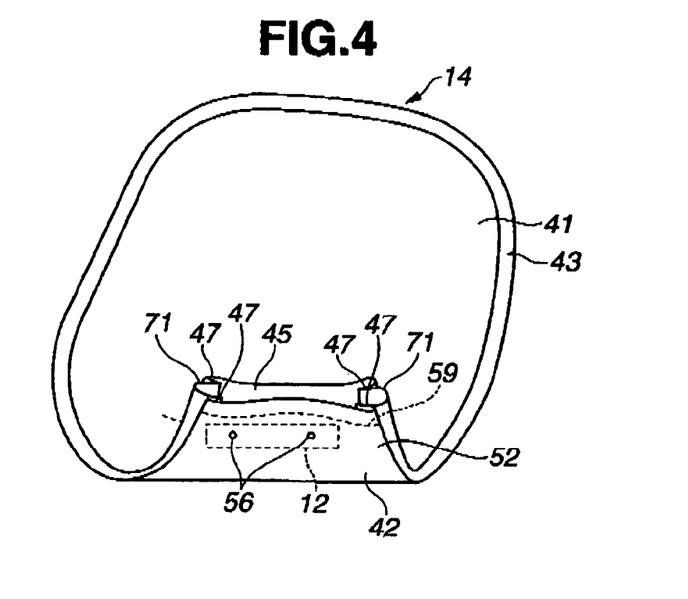
FIG. 4 is an explanatory diagram of a fold-fixed portion of the air bag shown in FIG. 1, which is folded back.
Figure 5:
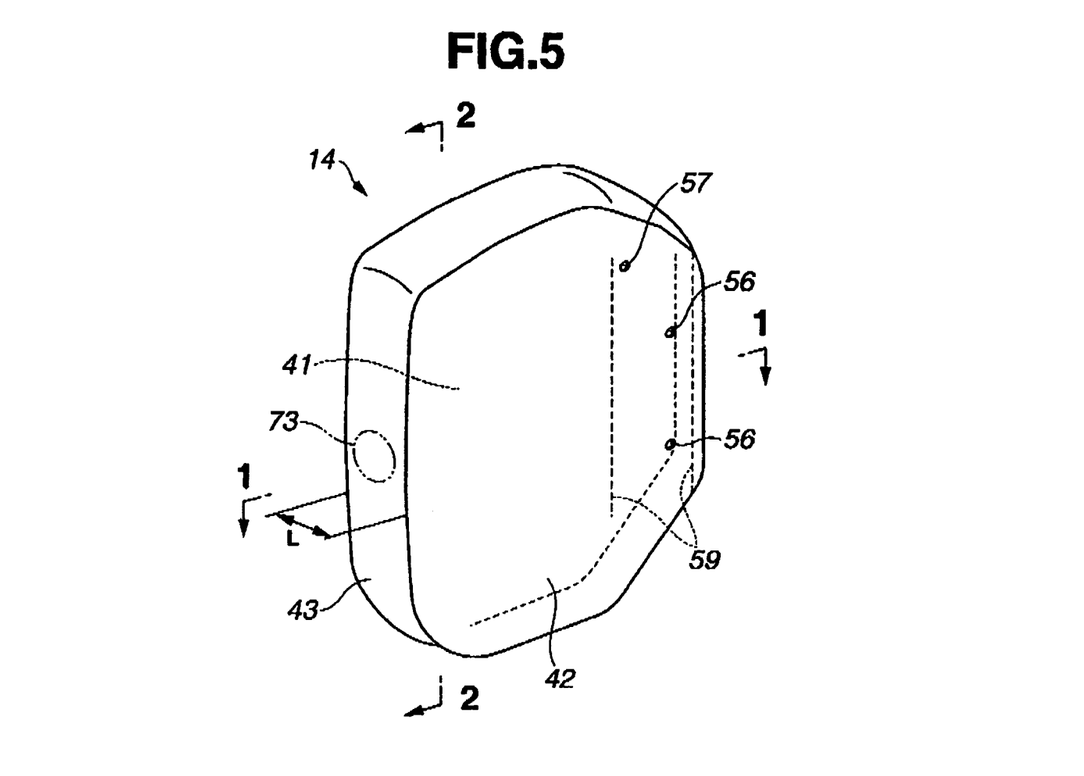
FIG. 5 is a perspective view of the air bag shown in FIG. 1.

Air bag 14 is constructed to be inflatable and deployable from one end portion thereof that serves as a starting point for deployment, along occupant A and developed into a flat box-shape or flat rectangular parallelepiped-shape in the fully deployed state as shown in FIG. 5. As illustrated in FIGS. 1-6, air bag 14 includes first panel 41, second panel 42 opposed to first panel 41 and third panel 43 that is interposed between first and second panels 41 and 42 and connects first and second panels 41 and 42 along the outer peripheries thereof together therethrough. Third panel 43 cooperates with first and second panels 41 and 42 to define opening 45 in the vicinity of the starting point for deployment of air bag 14. As shown in FIGS. 1 and 2, first panel 41 is opposed to occupant A. First and second panels 41 and 42 are made of base clothes that have substantially a same shape, specifically, a generally polygonal shape in plan view. In this embodiment, the base clothes have a generally rectangular shape. Third panel 43 is made of a belt-shaped base cloth having a predetermined width. Third panel 43 may be constructed such that the width of third panel gradually decreases toward the opening at the outer periphery that defines opening 45. First panel 41 and third panel 43 are connected with each other along entire outer peripheries 47 thereof except around opening 45 through two seam lines 48. Two seam lines 48 are provided along outer peripheries 47 of first and third panels 41 and 43 except around opening 45 which are overlapped with each other. Similarly, second panel 42 and third panel 43 are connected with each other along entire outer peripheries 47 thereof except around opening 45 through two seam lines 48. Two seam lines 48 are provided along outer peripheries 47 of second and third panels 42 and 43 except around opening 45 which are overlapped with each other.

Air bag 14 is formed as a bag-shaped shell by sewing first, second and third panels 41, 42 and 43 together in the following manner. First and third panels 41 and 43 are overlapped with each other so as to align outer peripheries 47, 47 thereof, and then sewed using a thread along mutually overlapped outer peripheries 47, 47 thereof except around opening 45. Next, second and third panels 42 and 43 are overlapped with each other so as to align outer peripheries 47, 47 thereof, and then sewed using a thread along mutually overlapped outer peripheries 47, 47 thereof except around opening 45. The thus-formed bag is turned inside out through opening 45, and then an end portion of the bag on the side of opening 45 is folded back onto an outside surface of first panel 41 to thereby provide fold-fixed portion 52 as shown in FIG. 4. Thus, there is provided air bag 14 that is deployable into the flat box-shape having a predetermined thickness between first panel 41 and second panel 42. That is, the width of third panel 43 serves as the thickness of air bag 14.

As illustrated in FIG. 1, air bag 14 includes inflator accommodating portion 51 that accommodates inflator 12 and fold-fixed portion 52 that rearward extends from inflator accommodating portion 51. Inflator accommodating portion 51 is disposed at the one end portion of air bag 14 which acts as the starting point for deployment of air bag 14. Namely, inflator accommodating portion 51 is located at a rear end portion of air bag 14 and spaced from opening 45. Fold-fixed portion 52 is folded back onto the outside surface of first panel 41 such that opening 45 is oriented forwardly, namely, in a direction of deployment of air bag 14, and fixed to frame 63 of seat 5 through vehicle-side fixing portion 32 of fixing member 16. Fold-fixed portion 52 serves for blocking fluid communication between inside and outside of air bag 14 through opening 45 and hermetically sealing air bag 14.

As illustrated in FIG. 3, fold-fixed portion 52 of air bag 14 includes a sandwich-fixed portion that is interposed between base plate 33 of retainer 25 and frame 63 of seat 5 and fixed to frame 63 through vehicle-side fixing portions 32, 32, and a remaining portion except the sandwich-fixed portion. The remaining portion of fold-fixed portion 52 is prevented from being interposed between base plate 33 of retainer 25 and frame 63 of seat 5 and from being fixed to frame 63. Specifically, fold-fixed portion 52 has a length smaller than an entire length of air bag 14 both of which extend in an up-and-down direction of the automobile. The sandwich-fixed portion has a length smaller than the length of fold-fixed portion 52. The remaining portion is located on an upper side of the sandwich-fixed portion and a lower side thereof. If an internal pressure within air bag 14 is excessively increased during deployment of air bag 14, the deployed portion of air bag 14 can be fluidly communicated with the outside of air bag 14 through the remaining portion. At this time, the remaining portion serves as gas discharge outlets 71, 71 through which the gas within air bag 14 is discharged from air bag 14. Gas discharge outlets 71, 71 have a generally triangular shape in section as shown in FIG. 3.

Figure 6:
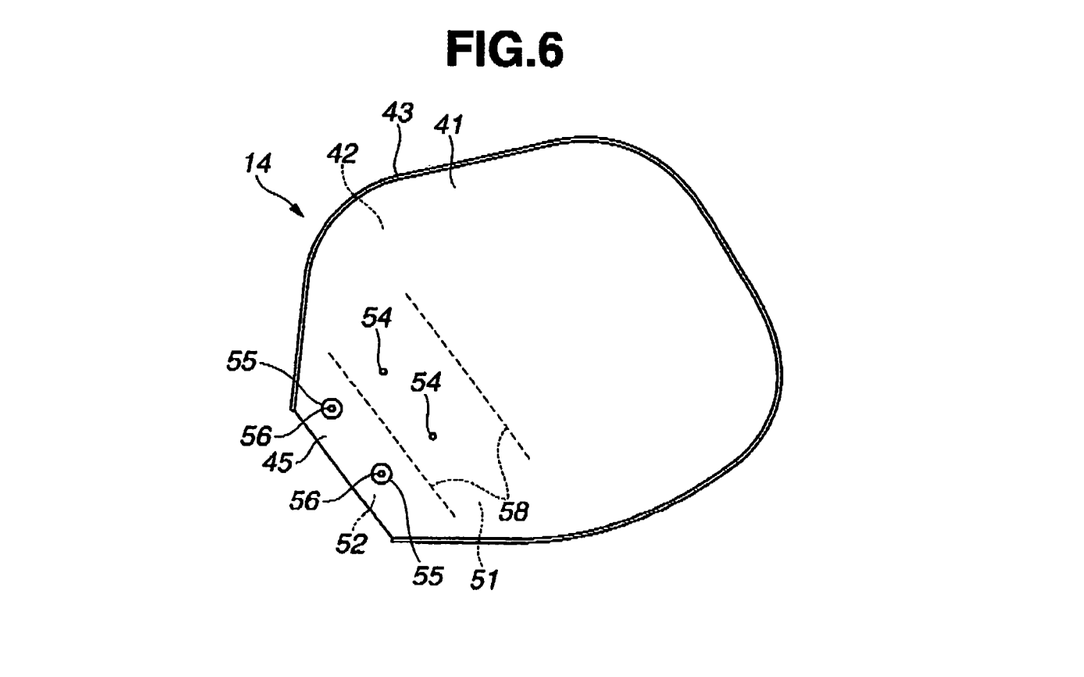
FIG. 6 is an explanatory diagram of the air-bag before the fold-fixed portion is folded back.

FIG. 6 shows a non-folded state of air bag 14 in which fold-fixed portion 52 is not folded back. As illustrated in FIG. 6, inflator accommodating portion 51 has a pair of mount holes 54, 54 and fold-fixed portion 52 has two pairs of mount holes 55, 55 and 56, 56. Vehicle-side, fixing portions 32, 32 are sequentially inserted into mount holes 54, 54 and mount holes 55, 55, 56, 56 upon assembling. Specifically, mount holes 54, 54 are formed on one part of first panel 41 which is located on inflator accommodating portion 51. Mount holes 55, 55 are formed on an adjacent part of first panel 41 which is disposed adjacent to the one part and located on fold-fixed portion 52. Mount holes 55, 55 are spaced apart from mount holes 54, 54 as shown in FIG. 6 and aligned and communicated therewith when fold-fixed portion 52 is folded back onto first panel 41. Mount holes 56, 56 are formed on a part of second panel 42 which is located on fold-fixed portion 52. Mount holes 56, 56 are opposed to and aligned with mount 55, 55 as shown in FIG. 6 and aligned and communicated with mount holes 54, 54 when fold-fixed portion 52 is folded back onto first panel 41. Mount holes 55, 55 have a diameter larger than diameters of respective mount holes 54, 54 and 56, 56. Vehicle-side fixing portions 32 penetrate first panel 41 located on inflator accommodating portion 51 and then first and second panels 41 and 42 located on fold-fixed portion 52 through these mount holes 54, 54, 55, 55 and 56, 56. Further, as illustrated in FIG. 5, second panel 42 is formed with insertion hole 57 for insertion of harness 23a.

A reinforcing cloth, for instance, a flame repellent, may be arranged inside air bag 14 in order to enhance reinforcing property and heat resistance of air bag 14. In this embodiment, a reinforcing cloth is disposed on an inside surface of first panel 41 which extends over inflator accommodating portion 51, and sewed to the inside surface thereof. The reinforcing cloth is thus connected to the inside surface of first panel 41 through two seam lines 58 as shown in FIG. 6. The reinforcing cloth for first panel 41 is formed of three rectangular-shaped base clothes that are overlapped with one another. Further, a reinforcing cloth is disposed on an inside surface of second panel 42 which extends from inflator accommodating portion 51 toward fold-fixed portion 52, and sewed to the inside surface thereof. The reinforcing cloth for second panel 42 is formed of three rectangular-shaped base clothes that are overlapped with one another. The reinforcing cloth is thus connected to the inside surface of second panel 42 through two seam lines 59 as shown in FIG. 5. In addition, first, second and third panels 41, 42 and 43 may be respectively formed of a plurality of overlapped base clothes. For example, each of first and second panels 41 and 42 may be formed of two overlapped base clothes.

A method of assembling air bag apparatus 11 will be explained hereinafter. First, inflator 12 is mounted to retainer 25 of fixing member 16 to thereby form a inflator unit assembly. The inflator unit assembly is inserted into air bag 14 through opening 45 and placed on inflator accommodating portion 51. Vehicle-side fixing portions 32, 32 of retainer 25 are pulled out from mount holes 54, 54 of first panel 41. Then, fold-fixed portion 52 is folded back onto the outside surface of first panel 41, and vehicle-side fixing portions 32, 32 are successively inserted into mount holes 55, 55 of first panel 41 and then mount holes 56, 56 of second panel 42. Next, air bag 14 is suitably folded, and then the folded air bag 14 is retained by means of a readily breakable retaining member such as a tape. The folded air bag 14 is then accommodated in casing 17. Air bag apparatus 11 is thus provided.

Thus-constructed air bag apparatus 11 is mounted to a side portion of the back of seat 5 of the automobile and secured to seat 5 by fastening vehicle-side fixing portions 32, 32 to flame 63 of seat 5 by means of nuts 61, 61 as shown in FIG. 1. In this state, the sandwich-fixed portion of fold-fixed portion 52 of air bag 14 is interposed between base plate 33 of retainer 25 and frame 63 of seat 5 and rigidly and hermetically supported therebetween. For the purpose of simple illustration. FIGS. 1 and 3 show the sandwich-fixed portion that is disposed between base plate 33 and frame 63 with a clearance when vehicle-side fixing portions 32, 32 are not completely fastened by nuts 61, 61. On the other hand, in the secured state of air bag apparatus 11, the remaining portion of fold-fixed portion 52 is free from being interposed between base plate 33 and frame 63. The remaining portion can serve as gas discharge outlets 71, 71 through which the gas within air bag 14 is discharged from air bag 14 upon occurrence of excessive increase in internal pressure within air bag 14.

An operation of air bag apparatus 11 now is explained. When the automobile undergoes an impact upon occurrence of side collision, inflator 12 is actuated by electric power supplied thereto via harness 23a so that gas is injected from gas supply portion 22 as shown in FIG. 3. The gas injected is guided by guide portion 35 of retainer 25 and distributed upward and downward at the predetermined ratio as viewed in FIG. 3. Air bag 14 is hit on casing 17 to breakage thereof and projects from seat 5 through casing 17 by the pressure of the gas. At this time, air bag 14 starts inflation and deployment from the side portion of the back of seat 5 toward a space between a side of occupant A and an inside surface of door 3. Air bag 14 is then fully developed into the flat box-shape to thereby cover and protect the side of occupant A as shown in FIGS. 1 and 2.

In the above-described embodiment of the present invention, air bag 14 as a so-called side air bag includes first panel 41 opposed to a side of occupant A, second panel 42 opposed an inside surface of a side of compartment 2, and third panel 43 connecting first and second panels 41 and 42 along outer peripheries 47 thereof together therethrough. Third panel 43 cooperates with first and second panels 41 and 42 to define opening 45 in the vicinity of the rear end portion of air bag 14 as the starting point for deployment of air bag 14. Third panel 43 has a belt-shape and is connected with first and second panels 41 and 42 through a series of stitching, i.e., seam lines 48, that continuously extends along outer peripheries 47 thereof except around opening 45 that is located on the rear side of air bag 14. Thus, there are provided seam lines 48 that continuously extend along a front end periphery, an upper periphery and a lower periphery of air bag 14 except the rear end periphery thereof neat which the starting point for deployment of air bag 14 is disposed. By connecting first, second and third panels 41, 42 and 43 together through seam lines 48, air bag 14 can be developed into a flat box-shape or flat rectangular parallelepiped-shape in the full-deployed state. Owing to the flat box-shape of air bag 14, air bag 14 can be stably deployed without locally changing the thickness between first and second panels 41 and 42 when viewed from a front side of occupant A. Specifically, when air bag 14 is fully deployed, a central portion of air bag 14 can be prevented from excessively increasing in thickness, and an outer peripheral portion of air bag 14 can be prevented from decreasing in thickness. Thus, the thickness of air bag 14 can be ensured, and therefore, air bag 14 can be quickly deployed even in a narrow space. Therefore, the gas supplied to air bag 14 can be efficiently used, thereby serving for facilitating downsizing air bag apparatus 11. Further, flat box-shaped air bag 14 has a vertical cross-section that is substantially uniform in a longitudinal direction of the automobile, whereby an oscillatory motion of air bag 14 upon deployment can be suppressed, and air bag 14 can be easily deployed at a desired position. Further, air bag 14 starts inflation from the rear end portion and then forward deploys into the flat box-shape. Therefore, a gas passage in air bag 14 can be formed at an initial stage of the inflation of air bag 14 and smoothly proceed so as to forward extend for deployment of air bag 14. This can reduce a load that is applied to respective panels 41, 42 and 43 constituting air bag 14.

As explained above, in the embodiment of the present invention, air bag 14 is so constructed as to start deployment from the rear end portion as the starting point and forward developed into the flat box-shape that has the predetermined thickness. Air bag 14, therefore, can ensure a predetermined impact-absorption stroke. Further, air bag 14 can be prevented from excessively increasing in thickness at a local region thereof in the full-deployed state. Further, air bag 14 can be quickly deployed such that a primary pressure is promptly produced without using a high-powered inflator. As a result, a load applied to air bag 14 can be totally reduced. Further, the deploying behavior and deploying attitude of air bag 14 that is supported at the one end portion can be stabilized. Particularly, in a case where air bag apparatus 11 is used in combination with a curtain air bag apparatus, it is required to surely protect a limited portion of the occupant, for instance, a side portion of the occupant which extends over a waist and a chest of the occupant. In this embodiment, air bag 14 can be stably and quickly deployed even in a narrow space to thereby protect such a limited portion of the occupant. Accordingly, air bag apparatus 11 of this embodiment may be used in combination with other air bag apparatus such as a curtain air bag apparatus.

Further, basically, air bag 14 is formed by sewing three panels 41, 42 and 43 together along outer peripheries 47 thereof. Thus, air bag 14 can be simply constructed without complicatedly overlapping these panels 41, 42 and 43 with one another. Further, since air bag 14 is formed as a three-dimensional shape using three panels 41, 42 and 43, it can be omitted to additionally attach a base cloth in order to ensure a three-dimensional shape of the air bag. In addition, air bag 14 is simple in shape and interior structure without cells that are connected with one another, and is developable into the box-shape. Therefore, air bag 14 can serve for facilitating the production. Further, in the production of air bag 14, after sewing three panels 41, 42 and 43, air bag 14 is provided by turning the bag inside out and putting outer peripheral edges of respective panels 41, 42 and 43 which are located outside along seam lines 48 into the bag. The turning operation can be easily carried out. Thus, air bag 14 can be produced without necessitating a complicated operation, thereby serving for enhancing the operating efficiency and reducing the number of parts and the production cost.

Further, as explained above, inflator 12 is mounted to the starting point for deployment of air bag 14, namely, inflator accommodating portion 51 of air bag 14. Fold-fixed portion 52 of air bag 14 rearward extends from inflator accommodating portion 51 and is folded back such that opening 45 is oriented in the direction of deployment of air bag 14. Vehicle-side fixing portions 32 of retainer 25 of fixing member 16 are inserted into mount holes 54, 54 of inflator accommodating portion 51 and mount holes 55, 55, 56, 56 of fold-fixed portion 52 and fixed to frame 63 as the automobile body by using nuts 61. Thus, air bag 14 can be fixedly supported between retainer 25 and frame 63.

In the fixedly supported state of air bag 14, the sandwich-fixed portion of fold-fixed portion 52 is interposed between retainer 25 and frame 63 and secured to frame 63, while the remaining portion of fold-fixed portion 52 is free from being interposed between retainer 25 and frame 63. The remaining portion is disposed on the upper and lower sides of the sandwich-fixed portion as shown in FIG. 3. Thus, when viewed in vertical cross-section as shown in FIG. 3, the remaining portion vertically extends in upper and lower regions of fold-fixed portion 52 except a middle region that is occupied by the sandwich-fixed portion. Since fold-fixed portion 52 is folded back the rear end peripheral portion of air bag 14 at an angle of 180 degrees, a deployable part of air bag 14 which is deployable by the pressure of the gas supplied thereto is substantially prevented from being fluidly communicated with the outside of air bag 14 through opening 45. Therefore, the deployable part of air bag 14 is substantially hermetically sealed from the outside of air bag 14.

Upon deployment of air bag 14, if there is no obstruction in the direction of deployment thereof, i.e., in the forward direction and an internal pressure within the deployed part of air bag 14 is not excessively increased, the deployed part thereof can be kept substantially hermetically sealed without fluid communication with opening 45. In contrast, upon deployment of air bag 14, if there is any obstruction in the direction of deployment thereof and the internal pressure within the deployed part of air bag 14 is excessively increased, the deployed part thereof will be fluidly communicated with opening 45 through the remaining portion of fold-fixed portion 52. At this time, the remaining portion of fold-fixed portion 52 acts as gas discharge outlets 71 shown in FIGS. 3 and 4 through which the gas within the deployed part of air bag 14 can be discharged to the outside of air bag 14. Accordingly, an excessive increase in the internal pressure of air bag 14 can be reduced, and an impact load applied to the obstruction or occupant A can be smoothly reduced. Further, third panel 43 located in fold-fixed portion 52 may be so constructed as to gradually decrease a width that extends between seam lines 48 along outer peripheries 47 of first and third panels 41 and 43 and seam lines 48 along outer peripheries 47 of second and third panels 42 and 43, toward opening 45. With this modification of third panel 43, it is possible to readily adjust gas discharging property of gas discharge outlets 71 that can permit the gas within air bag 14 to flow out from air bag 14 along third panel 43 upon occurrence of excessive increase in the internal pressure within air bag 14.

Further, as shown in FIG. 5, circular-shaped gas discharge outlet 73 can be provided in third panel 43 as indicated by two-dot chain line. Gas discharge outlet 73 is located opposite to opening 45 at a front end portion of air bag 14. Gas discharge outlet 73 has a diameter that is substantially equivalent to the width of third panel 43 and not beyond the width thereof. The width of third panel 43 is indicated by "L" in FIG. 5.

In the above-modification, since the diameter of gas discharge outlet 73 is substantially equivalent to width L of third panel 43, the box-shape of air bag 14 can be maintained without interference between gas discharge outlet 73 and seam lines 48 along outer peripheries 47. In addition, with the provision of circular-shaped gas discharge outlet 73 at the front end portion of air bag 14, air bag 14 can be prevented from being deformed into shape other than the box-shape when deployed. This ensures an area of gas discharge outlet 73 and thereby stabilizes the gas discharge property.

Further, the shape of air bag 14 is not limited to the above-described embodiment. In a case where a curtain air bag is not used in combination with air bag 14, air bag 14 may be so constructed as to be increased in volume and upward deployable to protect a head of the occupant.

Further, shapes and constructions of inflator 12 and fixing member 16 are not limited to the above-described embodiment and may be selected from various types. For example, inflator 12 may be a so-called pyro-type inflator (pyrotechnic inflator) that generates a high gas pressure when ignited. Retainer 25 of fixing member 16 may be equipped with a cooling member for cooling the gas supplied from inflator 12.

This application is based on a prior Japanese Patent Application No. 2005-104338 filed on Mar. 31, 2005. The entire contents of the Japanese Patent Application No. 2005-104338 is hereby incorporated by reference.

Although the invention has been described above by reference to a certain embodiment and modifications of the invention, the invention is not limited to the embodiment and modifications described above. Other modifications and variations of the above-described embodiment and modifications will occur to those skilled in the art in light of the above teachings. The scope of the invention is defined with reference to the following claims.

What is claimed is:

1. An air bag for a vehicle, the air bag being deployable from a rear end portion thereof as a starting point for deployment along an occupant of the vehicle, the air bag comprising:
   a first panel adapted to be opposed to the occupant;
   a second panel opposed to the first panel; and
   a third panel formed in a belt-shape and having two opposed outer peripheries in a longitudinal direction thereof, the third panel being connected to the first and second panels to define an opening in the vicinity of the rear end portion of the air bag which is the starting point for deployment,
   wherein the first and third panels are connected with each other along an entire outer periphery of the first panel and one of the two opposed outer peripheries of the third panel except around the opening of the air bag, and the second and third panels are connected with each other along an entire outer periphery of the second panel and the other of the two opposed outer peripheries of the third panel except around the opening, wherein the air bag starts inflation from the rear end potion and then forward deploys.

2. An air bag for a vehicle, the air bag being deployable from one end portion thereof as a starting point for deployment along an occupant of the vehicle, the air bag comprising:
a first panel adapted to be opposed to the occupant;
a second panel opposed to the first panel; and
a third panel cooperating with the first and second panels to define an opening in the vicinity of the staffing point for deployment,
wherein the first and third panels are connected with each other along entire outer peripheries thereof except around the opening of the air bag, and the second and third panels are connected with each other along entire outer peripheries thereof except around the opening,
wherein the first and second panels are made of base clothes that have substantially a same shape, the third panel is made of a belt-shaped base cloth, the entire outer peripheries of the first and third panels except around the opening of the air bag are overlapped and connected with each other through a first seam line, and the entire outer peripheries of the second and third panels except around the opening of the air bag are overlapped and connected with each other through a second seam line.

3. The air bag as claimed in claim 2, wherein the first and second panels have a generally polygonal shape.

4. The air bag as claimed in claim 2, wherein the first and second panels have a generally rectangular shape.

5. The air bag as claimed in claim 2, wherein the third panel has a width that extends between the first and second seam lines, the width of the third panel gradually decreasing toward the opening at an outer periphery of the third panel which defines the opening.

6. The air bag as claimed in claim 2, wherein the third panel includes a circular gas discharge outlet that is located opposite to the opening, the circular gas discharge outlet having a diameter substantially equivalent to a width of the third panel which extends between the first and second seam lines.

7. An air bag apparatus for a vehicle, the air bag apparatus being useable within a compartment of the vehicle, the air bag apparatus comprising:
an air bag deployable from a rear end portion thereof as a starting point for deployment along an occupant of the vehicle, the air bag including a first panel adapted to be opposed to the occupant, a second panel opposed to the first panel, and a third panel formed in a belt-shape and having two opposed outer peripheries in a longitudinal direction thereof, the third panel being connected to the first and second panels to define an opening in the vicinity of the rear end portion serving as the starting point for deployment, the first and third panels being connected with each other along an entire outer periphery of the first panel and one of the two opposed outer peripheries of the third panel except around the opening of the air bag, the second and third panels being connected with each other along an entire outer periphery of the second panel and the other of the two opposed outer peripheries of the third panel except around the opening; and
an inflator unit assembly inserted into the air bag through the opening for supplying gas to the air bag,
wherein the air bag is disposed at a folded state behind a back of the occupant and deployable between the occupant and an inside surface of a side of the compartment so as to cover a side of the occupant when the gas is supplied to the air bag,
wherein the rear end portion starts inflation and then forward deploys.

8. The air bag apparatus as claimed in claim 7, wherein the air bag includes an inflator accommodating portion to which the inflator is mounted and a fold-fixed portion that extends from the inflator accommodating portion and is folded so as to orient the opening in a direction of deployment of the air bag,
wherein the air bag apparatus further comprises a fixing member that includes an inflator fixing portion that fixes the inflator to the inflator accommodating portion of the air bag, the fixing member further including an air bag opposing portion that is opposed to an inside surface of the air bag and connected with the inflator fixing portion, the fixing member further including a vehicle-side fixing portion that projects from the air bag opposing portion and is fixed to a vehicle body,
wherein the vehicle-side fixing portion of the fixing member penetrates the first panel that is located on the inflator accommodating portion and the first and second panels that are located on the fold-fixed portion,
wherein the fold-fixed portion of the air bag includes a sandwich-fixed portion that is interposed between the vehicle body and the air bag opposing portion of the fixing member and fixed to the vehicle body through the vehicle-side fixing portion and a remaining portion except the sandwich-fixed portion which is prevented from being interposed between the vehicle body and the air bag opposing portion of the fixing member, and
wherein the remaining portion of the fold-fixed portion serves as a gas discharge outlet through which the gas within the air bag is discharged from the air bag.

9. The air bag apparatus as claimed in claim 8, wherein the first and second panels are made of a base cloth that has substantially a same shape, the third panel is made of a base cloth having the belt-shape, the entire outer peripheries of the first and third panels except around the opening are overlapped and connected with each other through a first seam line, and the entire outer peripheries of the second and third panels except around the opening are overlapped and connected with each other through a second seam line, and
wherein the third panel located on the fold-fixed portion of the air bag has a width that extends between the first and second seam lines and gradually decreases toward the opening.

10. The air bag apparatus as claimed in claim 8, wherein the inflator accommodating portion is disposed at the one end portion of the air bag.

11. The air bag apparatus as claimed in claim 7, wherein the first and second panels are made of base clothes that have substantially a same shape, the third panel is made of a base cloth having the belt-shape, the entire outer peripheries of the first and third panels except around the opening are overlapped and connected with each other through a first seam line, and the entire outer peripheries of the second and third panels except around the opening are overlapped and connected with each other through a second seam line.

12. The air bag apparatus as claimed in claim 11, wherein the first and second panels have a generally polygonal shape.

13. The air bag apparatus as claimed in claim 11, wherein the first and second panels have a generally rectangular shape.

14. The air bag apparatus as claimed in claim 11, wherein the third panel includes a circular gas discharge outlet that is located opposite to the opening, the circular gas discharge outlet having a diameter substantially equivalent to a width of the third panel which extends between the first and second seam lines.

15. An air bag apparatus for a vehicle, comprising:

an air bag deployable from one end portion thereof, serving as a starting point for deployment of the air bag, into a flat box-shape along a side of an occupant of the vehicle, the air bag being formed by a first panel, a second panel opposed to the first panel and a third panel interposed between the first and second panels and cooperating with the first and second panels to define an opening formed in the vicinity of the one end portion, the first and third panels being connected with each other along entire outer peripheries thereof except around the opening, the second and third panels being connected with each other along entire outer peripheries thereof except around the opening, wherein a width of the third panel defines a thickness of the flat box-shape of the air bag, wherein the thickness is a distance between the first and second panels;

an inflator disposed inside the one end portion of the air bag in the vicinity of the opening, the inflator supplying gas to the air bag; and fixing means disposed at the one end portion of the air bag in the vicinity of the opening for fixing the air bag with the inflator to a vehicle body, wherein the one end portion of the air bag on a side of the opening includes a fold-fixed portion that is folded back onto an outside surface of the first panel, to block fluid communication between an inside of the air bag and an outside thereof through the opening and fixed to the vehicle body by the fixing means.

16. An air bag apparatus for a vehicle comprising:

an air bag deployable from one end portion thereof into a flat box-shape along a side of an occupant of the vehicle, the air bag being formed by a first panel, a second panel opposed to the first panel and a third panel interposed between the first and second panels and cooperating with the first and second panels to define an opening, the first and third panels being connected with each other along entire outer peripheries thereof except around the opening, the second and third panels being connected with each other along entire outer peripheries thereof except around the opening;

an inflator disposed inside the one end portion of the air bag, the inflator supplying gas to the air bag; and fixing means for fixing the air bag with the inflator to a vehicle body, wherein the air bag includes a fold-fixed portion that is folded to block fluid communication between an inside of the air bag and an outside thereof through the opening and fixed to the vehicle body by the fixing means, wherein the first and second panels are made of base clothes that have substantially a same shape, the third panel is made of a belt-shaped base cloth, the entire outer peripheries of the first and third panels except around the opening are overlapped and connected with each other through a first seam line, and the entire outer peripheries of the second and third panels except around the opening are overlapped and connected with each other through a second seam line.

17. The air bag apparatus as claimed in claim 15, wherein the first and second panels have a generally polygonal shape.

18. The air bag apparatus as claimed in claim 15, wherein the first and second panels have a generally rectangular shape.

19. The air bag apparatus as claimed in claim 15, wherein the fold-fixed portion of the air bag includes a sandwich-fixed portion that is interposed between the vehicle body and the fixing means and fixed to the vehicle body through the fixing means and a remaining portion except the sandwich-fixed portion which is prevented from being interposed between the vehicle body and the fixing means, and wherein the remaining portion of the fold-fixed portion serves as a gas discharge outlet through which the gas within the air bag is discharged from the air bag.

20. The air conditioner as claimed in claim 16, wherein the third panel includes a circular gas discharge outlet that is located opposite to the opening, the circular gas discharge outlet having a diameter substantially equivalent to a width of the third panel which extends between the first and second seam lines.

* * * * *